(12) United States Patent
Heranger et al.

(10) Patent No.: US 10,683,081 B2
(45) Date of Patent: Jun. 16, 2020

(54) AIRCRAFT PROPELLER COMPRISING COLLAPSIBLE VARIABLE PITCH BLADES

(71) Applicant: ARIANEGROUP SAS, Paris (FR)

(72) Inventors: Christophe Heranger, Conflans Sainte Honorine (FR); Marco Prampolini, Chambourcy (FR)

(73) Assignee: ARIANEGROUP SAS, Paris (FR)

( * ) Notice: Subject to any disclaimer, the term of this patent is extended or adjusted under 35 U.S.C. 154(b) by 76 days.

(21) Appl. No.: 16/086,817

(22) PCT Filed: Mar. 20, 2017

(86) PCT No.: PCT/EP2017/056512
§ 371 (c)(1),
(2) Date: Sep. 20, 2018

(87) PCT Pub. No.: WO2017/162561
PCT Pub. Date: Sep. 28, 2017

(65) Prior Publication Data
US 2019/0061914 A1  Feb. 28, 2019

(30) Foreign Application Priority Data
Mar. 21, 2016 (FR) .................................... 16 52398

(51) Int. Cl.
*B64C 11/28* (2006.01)
*B64C 27/50* (2006.01)
(Continued)

(52) U.S. Cl.
CPC .............. *B64C 11/28* (2013.01); *B64C 11/06* (2013.01); *B64C 27/50* (2013.01); *B64C 11/32* (2013.01);
(Continued)

(58) Field of Classification Search
CPC .......... B64C 11/28; B64C 11/06; B64C 27/50
See application file for complete search history.

(56) References Cited

U.S. PATENT DOCUMENTS

| 3,749,515 A | 7/1973 | Covington et al. |
| 2004/0118970 A1 | 6/2004 | Muylaert et al. |

(Continued)

FOREIGN PATENT DOCUMENTS

| FR | 2 140 108 A1 | 1/1973 |
| WO | 2015/133980 A1 | 9/2015 |

OTHER PUBLICATIONS

International Search Report and Written Opinion for International Application No. PCT/EP2017/056512 dated Jun. 16, 2017.
(Continued)

*Primary Examiner* — Nathaniel E Wiehe
*Assistant Examiner* — Michael K. Reitz
(74) *Attorney, Agent, or Firm* — Pearne & Gordon LLP

(57) ABSTRACT

Propeller for an aircraft engine comprising: a blade mounting associated with each blade, mounted so as to pivot on the hub according to an incident pitch axis; a pivoting link between each blade mounting and the root, allowing the blade to pivot relative to the blade mounting thereof according to a blade collapsing axis; associated with at least one of the blades, a member for controlling the collapsing/extension of the blade configured to pivot the root relative to the blade mounting according to the collapsing axis; and a passive device for synchronising the collapsing/extension of the blades, including a central synchronisation element mounted so as to rotate relative to the hub according to the propeller rotation axis, as well as a coupling element associated with each blade, including a first end mounted on the blade root and a second end mounted on the central synchronisation element.

11 Claims, 3 Drawing Sheets

(51) Int. Cl.
*B64C 11/06* (2006.01)
*B64C 11/32* (2006.01)

(52) U.S. Cl.
CPC .... *B64C 2201/165* (2013.01); *B64C 2201/20* (2013.01)

(56) References Cited

U.S. PATENT DOCUMENTS

2010/0072325 A1   3/2010   Sambell
2016/0152329 A1*  6/2016   Tzeng ................ B64C 29/0033
                                                        416/134 R
2017/0144746 A1*  5/2017   Schank ................ B64D 27/20

OTHER PUBLICATIONS

Preliminary French Search Report for French Patent Application No. 1652398 dated Oct. 14, 2016.

* cited by examiner

AIRCRAFT PROPELLER COMPRISING COLLAPSIBLE VARIABLE PITCH BLADES

TECHNICAL FIELD

The invention relates to the field of aircraft engine propellers, in particular rotatably controlled propellers having a substantially constant speed.

They are applicable to any type of aircraft, as for example drones.

STATE OF PRIOR ART

From prior art, it is known aircraft engine propellers the blades of which have a foldable nature, so as to be able to be moved from a spread out active position to a retracted position, and vice versa. This type of system is mainly widespread on small-size private planes, for the purpose of being capable of folding the propeller once the plane is on the ground. This enables the plane bulk to be reduced and its propeller to be protected. Another functionality can lie in folding the propeller during the flight, in order to decrease the induced drag thereof.

Further, on airplanes having a greater size, it is known to provide propeller blades pivotably mounted on the hub in order to allow the incidence pitch thereof. Indeed, the variation in the blade incidence angle during a flight makes it possible to adapt at each moment to thrust needs without modifying the parameters of this flight, and while keeping a substantially constant rotation speed of the propeller.

However, no technical solution has yet been proposed to associate both abovementioned functionalities within a same propeller, that is giving a variable pitch to the blades while making them foldable. There is thus a need for this.

DISCLOSURE OF THE INVENTION

The purpose of the invention is thus to meet at least partially the above-identified need.

For this, one purpose of the invention is a propeller for an aircraft engine for being rotated about a propeller axis of rotation, the propeller comprising a hub as well as a plurality of blades circumferentially distributed about the hub, and further comprising:

- a blade support associated with each blade, said blade support being pivotably mounted on said hub about an incidence pitch axis;
- incidence control means for the blades configured to pivot said blade support relative to the hub, about said incidence pitch axis;
- a pivot connection between each blade support and the root of its associated blade, the pivot connection enabling the blade to be pivoted relative to its blade support about a blade folding axis;
- associated with at least one of the blades, a blade folding/unfolding control member configured to pivot said blade root relative to the blade support about said folding axis, said folding/unfolding control member comprising a first element and a second element translationally movable with respect to each other, the first element being mounted on said hub using a first pivot connection and the second element being mounted on a transmission device using a second pivot connection, the transmission device being fitted to said blade root;
- a blade folding/unfolding synchronization passive device, including a central synchronization element rotatably mounted relative to the hub about said propeller axis of rotation, as well as a connector element associated with each blade, said connector element including a first end mounted on said blade root about a first ball joint, as well as a second end mounted on said central synchronization element using a second ball joint.

The invention is remarkable in that it enables the above-identified need to be met, in a clever, simple and efficient manner. In particular, the implementation of ball/ball joints introduces degrees of freedom of motion useful for going about with the pivoting of the blades, during their incidence pitch. Likewise, these ball/ball joints are useful for the kinematics of blade folding/unfolding, motion during which the central synchronization element freely rotates about the hub about the propeller axis of rotation. In this regard, it is noted that the passive synchronization device enables not only the occurrence of mass unbalances during folding/unfolding motions to be avoided, but also enables a number of folding/unfolding control members lower than the number of propeller blades to be provided.

The invention is also remarkable in that it has a design which can be implemented on existing blade variable pitch propellers, without causing significant modifications.

Further, it makes it possible to contemplate blade unfolding with the already rotating propeller, or with a stopped propeller.

Finally, it is both adapted to propellers mounted in a push configuration (called "pusher"), in which the blades fold up rearward, and to propellers mounted in pull configuration (called "puller") in which the blades fold up forward.

In addition, the invention has at least any of the following optional characteristics, taken alone or in combination.

The propeller comprises at least two blade folding/unfolding control members, respectively associated with two blades. As previously discussed, the number of these control members can be lower than the number of blades, but can alternatively be identical to the latter. By way of example, the number of control members is half that of the propeller blades. Also by way of example, it is noted that a single folding/unfolding control member could be associated to all the propeller blades.

Preferably, said blade folding/unfolding control member is a controlled cylinder, preferably a hydraulic cylinder. The cylinder can be controlled in "pusher" or "puller" modes, depending on the propeller design. Additionally, it is noted that in "puller" mode, the cylinder can fulfill a damper function.

Preferably, each connector element is a connecting rod.

Preferably, said central synchronization element is a ring.

Preferably, said transmission device comprises two links hinged to each other.

Preferably, the blade folding axis and incidence pitch axis are substantially orthogonal.

Preferably, the number of blades is between one and four, even if a greater number could be provided, without departing from the scope of the invention.

Preferably, the folding/unfolding control member is oriented substantially parallel to the propeller axis of rotation when the blades lie in an active spread out position.

Another object of the invention is an aircraft engine including a propeller as described above, preferably configured such that this propeller rotates at a substantially constant speed about its rotation axis. However, it is conventionally indicated, that the rotation speed of the propeller can be controlled at a slightly lower speed by the pilot, in order to optimize the thrust or fuel consumption, depending on the mission.

Further advantages and characteristics of the invention will appear in the detailed non-limiting description below.

BRIEF DESCRIPTION OF THE DRAWINGS

This description will be made with regard to the appended drawings in which;

FIG. 1b is a side schematic view of the propeller shown in FIG. 1a;

DETAILED DESCRIPTION OF PREFERRED EMBODIMENTS

Figure 1A:
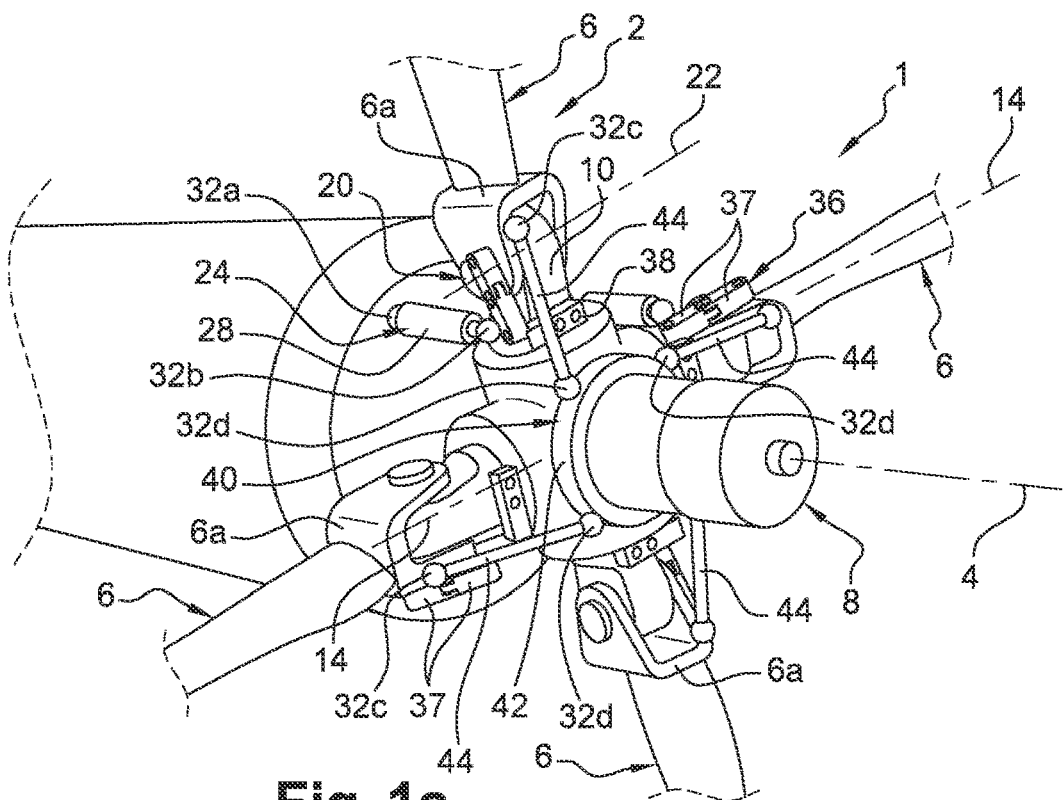
FIG. 1a represents a perspective schematic view of a propeller according to the invention, in a spread out active position.
Figure 1B:
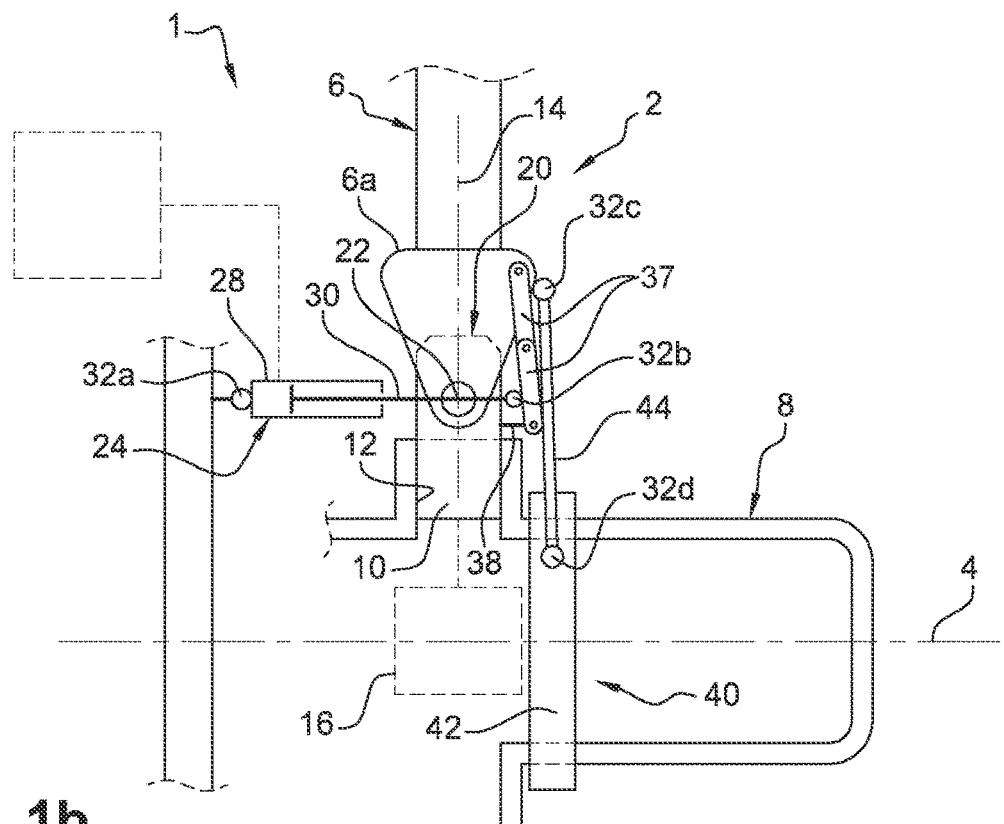

In reference first to FIGS. 1a and 1b, a propeller 2 for an aircraft engine 1, for example an engine for a drone, is represented. This is for example an engine adapted for a vehicle with a mass in the order of five tones, and the propeller 2 of which is for being rotated at a substantially constant about its propeller rotation axis 4, for example at a maximum speed in the order of 2000 rpm. For this, the engine 1 is conventionally equipped with a control system (not represented), enabling a variation in the propeller blade incidence to be commanded in order to maintain its rotation speed constant, regardless of required power needs.

The propeller 2 includes a plurality of blades 6, here four of them present, circumferentially evenly distributed about the rotation axis 4. These blades 6 are externally carried by a propeller hub 8, rotatably movably mounted about the axis 4 with respect to a fixed part of the engine.

Figure 2A:
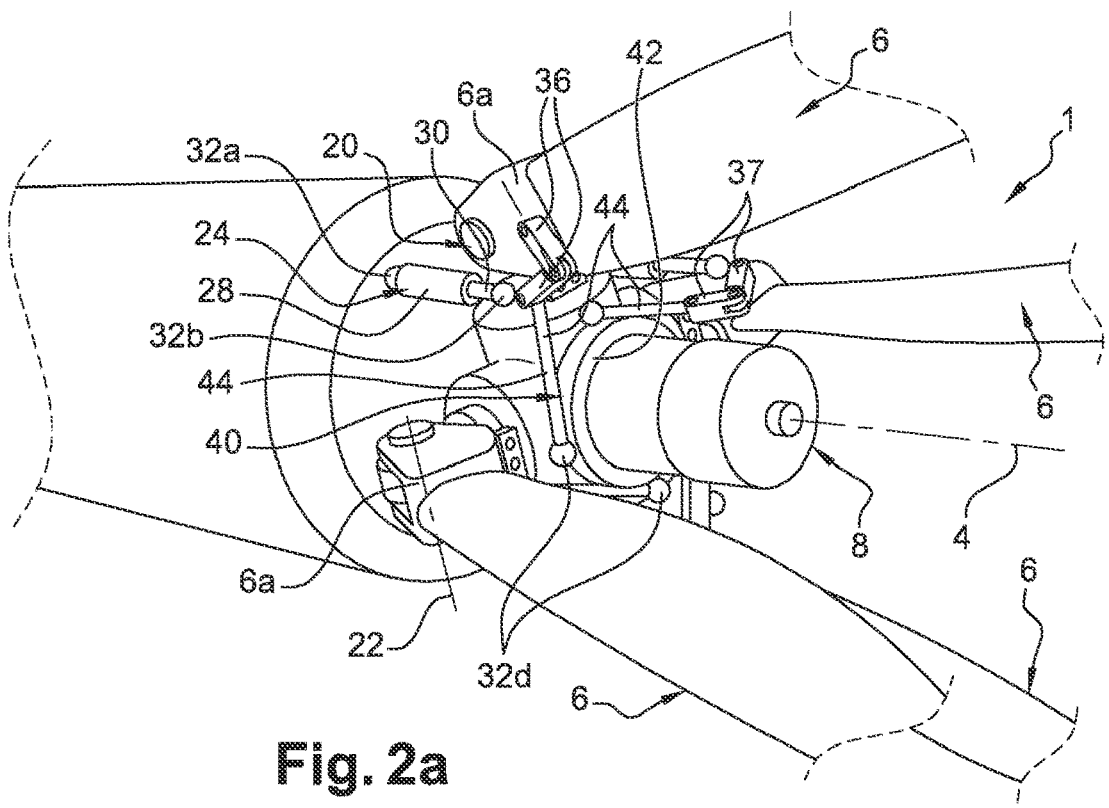
FIG. 2a is a view analogous to that of FIG. 1a, with the propeller represented in a position close to the retracted position.
Figure 2B:
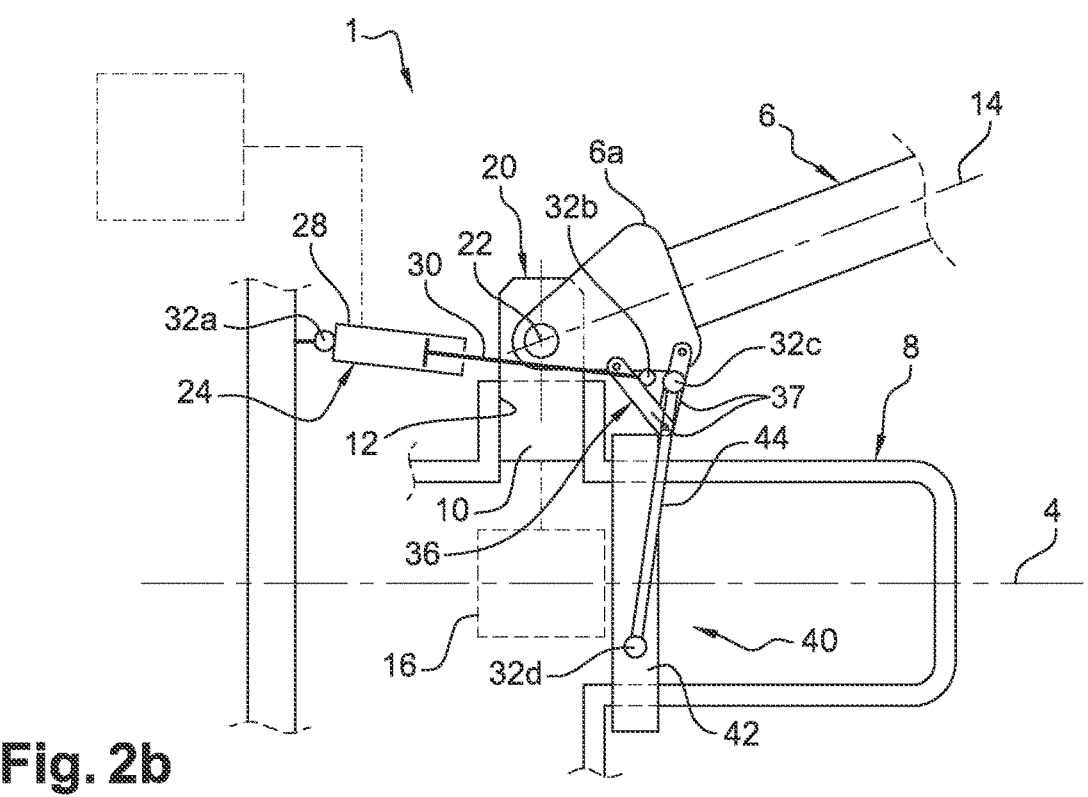
FIG. 2b is a view analogous to that of FIG. 1b, with the propeller represented in a position close to the retracted position.

The feature of the invention is to present a design enabling not only the incidence pitch of its blades 6, but also folding/unfolding of its blades between a spread out active position as shown in FIGS. 1a and 1b, and a retracted position or folded position, close to that shown in FIGS. 2a and 2b.

Still in reference to FIGS. 1a and 1b, the propeller 2 comprises a blade support 10 associated with each blade. This support 10 is radially arranged in connection with the rotation axis 4, and passes through an aperture 12 of the hub 8. The blade support 10 is pivotably mounted in this aperture 12 of the hub, about an incidence pitch axis 14 which is substantially radially oriented. As schematically shown in FIG. 1b, each blade support 10 cooperates in a known manner with blade incidence control means 16, housed inside the hub 8. These means 16 are configured to simultaneously pivot each blade support 10 in its aperture 12, about its incidence pitch axis 14. This pivoting is made in response to a command from the engine control system, aiming at modifying the pitch angle of the blades 6 of the propeller.

Further, each blade 6 includes an aerodynamic part as well as a base forming a blade root 6a. The latter takes the form of a yoke hinged to its associated blade support 10, by virtue of a pivoting connection 20. This connection defines a blade folding axis 22, with a substantially tangential orientation relative to the rotation axis 4, by being thus substantially orthogonal to the latter. Consequently, the pivoting connection 20 enables the blade 6 to be pivoted relative to its blade support 10, about the blade folding axis 22 also substantially orthogonal to the incidence pitch axis 14. In this regard, it is noted that blade folding is herein provided such that the blades swing forward, since the engine has a pulling configuration (called "puller") in which the propeller is mounted at the front of the gas generator. However, a reversed configuration (called a "pusher") could be assumed without departing from the scope of the invention. In this case, the blades can be provided to fold rearward.

For performing folding/unfolding of the propeller, at least one blade folding/unfolding control member 24 associated with a blade 6 is provided. For example, only two of the four blades 6 are equipped with such a control member 24, even if the number of these members could be lower or higher, without departing from the scope of the invention.

The blade folding/unfolding control member 24 is configured to pivot the blade root 6a relative to the blade support 10, about the folding axis 22. This is preferentially a controlled hydraulic cylinder, comprising a cylinder body 28 as well as a cylinder rod 30 translationally movable with respect to each other. In a spread out active position as shown in FIGS. 1a and 1b, the control member 24 is oriented substantially parallel to the rotation axis 4 of the propeller.

The cylinder body 28 is mounted on a rear part of the hub 8 using a first pin joint 32a, whereas the cylinder rod 30 is mounted on a transmission device 36 using a second pin joint 32b. More precisely, the transmission device 36 includes two links 37 hinged to each other, and one of which is also hinged to the blade root 6a, and the other of which is hinged to a bracket 38 rotatably integral with the blade support 10. The three hinge axes are parallel to each other, and also parallel to the blade folding axis 22.

Both links 37 succeed one another along the radial direction, by being arranged outside the hub 8. The link located radially inwardly has an connecting eyelet (reference 50 in FIG. 3) to the cylinder rod 30, at which the second pin joint 32b is made.

By way of indicating purposes, it is noted that the axes supporting the first and second pivot connections 32a, 32b are preferentially parallel to the blade folding axis 22.

Figure 3:
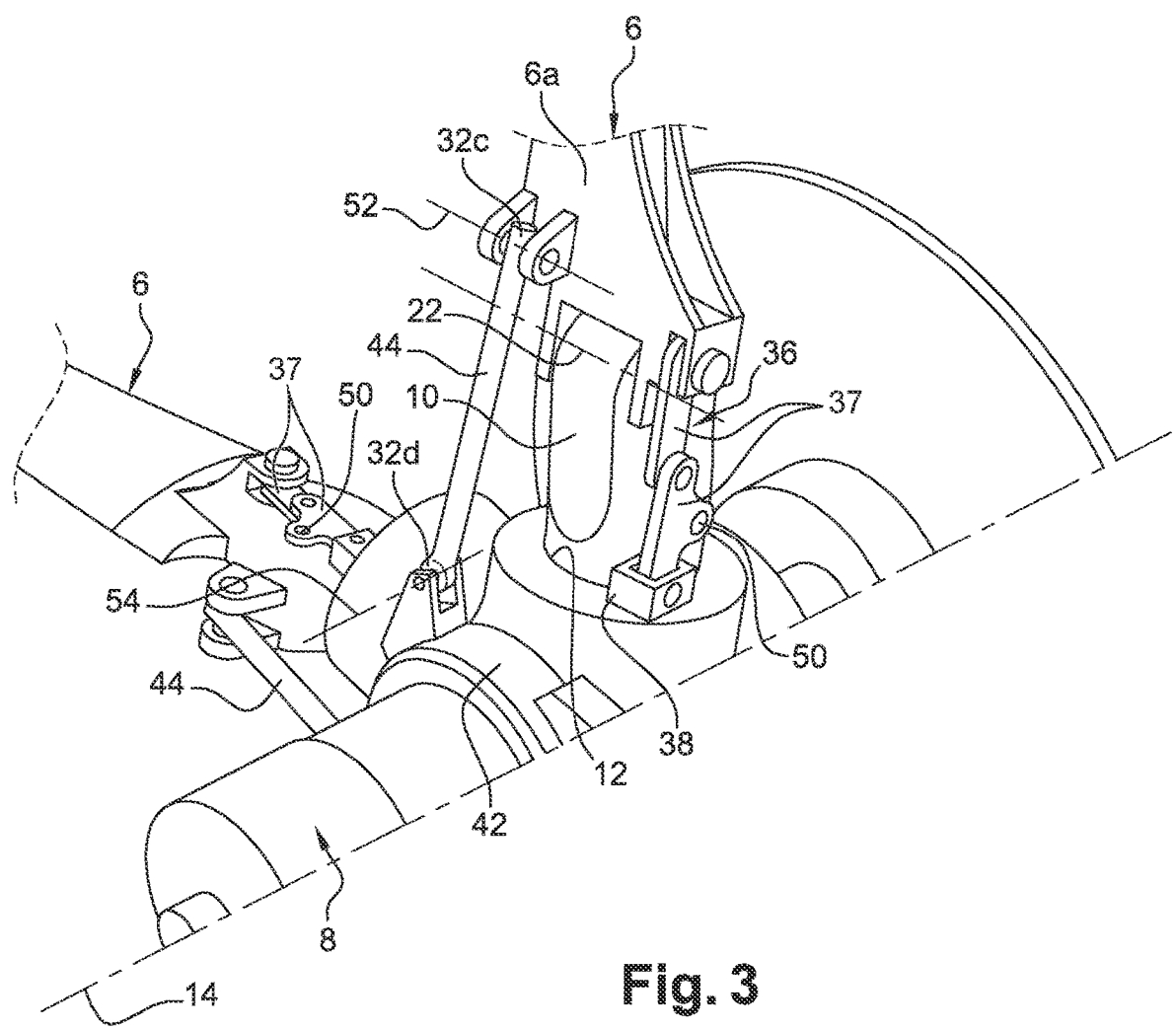
FIG. 3 is a perspective partial view of the propeller shown in FIG. 1a, and represented in further detail.

Finally, the propeller 2 includes a passive device 40 for synchronizing folding/unfolding of the blades 6. This device 40 first includes a central synchronization element 42 in the form of a ring, arranged about the front part of the hub 8. This ring 42 is translationally blocked along the propeller rotation axis 4, and turns out to be only rotatably movable about the same axis 4, relative to the hub 8. It also includes a connector element 44 associated with each blade 6, preferably in the form of a connecting rod. Its first end is mounted on the blade root 6a according to a first ball joint 32c, and its second end is mounted on the central synchronization ring 42 using a second ball joint 32d. Each connecting rod 44 extends substantially forward, and has an angle along the radial direction when viewed in a front view. As can be seen in FIG. 3 which is more detailed but in which the control members have been removed for the sake of clarity, the axes supporting the first and second ball joints 32c, 32d are preferentially orthogonal to each other. Indeed, the axis supporting the first ball joint 32c, the orientation of which is symbolized by the dotted line 52, is parallel to the blade folding axis 22, whereas the axis supporting the second ball joint 32d, the orientation of which is symbolized by the dotted line 54, is parallel to the rotation axis 4 of the propeller.

With the design described above, in case of incidence variation controlled by the means 16, each blade support 10 pivots about its axis 14 relative to the hub 8. This pivoting goes along with a movement of the cylinders 24 and connecting rods 44, by virtue of the pin/ball joints 32a-32d. Additionally, during the motion of the connecting rods 44, it can came with a small rotation of the ring 42 about the hub 8, about the axis 4.

When a propeller folding is controlled, the control members 24 are actuated accordingly until the blades 6 reach their retracted position close to that shown in FIGS. 2a and 2b. Herein, this is a spreading out of the cylinder 24, the cylinder rod 30 of which causes the radially internal link to pivot forward, by driving therewith the other link which in turn urges the blade root 6 to pivot forward about the axis 22. Both links 37 thus switch from a configuration where they are substantially radially aligned, to a configuration in which they form a rearward open V. It is noted that the design retained can be such that in the unfolded position, both links 37 can assume a position in which they are slightly tilted with respect to each other, so as to form a very flared V and above all with a reverse direction with respect to the abovementioned V, which is rearward open. This enables the accidental return of the blades to the folded position to be prevented.

Pivoting the blades 6 is made at an angle close to 90°, such that their initially radial orientation gradually swings until it become substantially axial. During this pivoting of the blades 6, the first end of each connecting rod 44 is forward driven, whereas this movement is compensated for by the rotation of the ring 42 about the hub 8, caused by the induced movement of the second end of each connecting rod 44. In this regard, it is indicated a functional clearance is preferentially provided on each connecting rod to avoid any hyperstatic loop between the synchronization device and the blade incidence control means located inside the rotor.

The gap of the second ends of the connecting rods 44 on the ring 42 is even, whereby folding the propeller 2 is advantageously made in a synchronized manner. Of course, folding the propeller 2 forward must oppose to the aerodynamic force being applied to the blades 6 during the flight, regardless of whether the propeller rotates or is at rest.

For unfolding the propeller 2, the above-described principles are made in the reverse direction. In this regard, it is noted that unfolding/spreading out can be made whereas the propeller rotates, or even with the propeller at rest. In the first case, the centrifugal force advantageously assists the spreading out.

Of course, various modifications can be provided by those skilled in the art to the invention just described, only by way of non-limiting examples.

What is claimed is:

1. A propeller (2) for an aircraft engine (1) for being rotated about a propeller axis of rotation (4), the propeller comprising a hub (8) as well as a plurality of blades (6) circumferentially distributed about the hub, characterized in that it further comprises:

a blade support (10) associated with each blade, said blade support being pivotably mounted on said hub (8) about an incidence pitch axis (14);

incidence control means (16) for the blades configured to pivot said blade support (10) relative to the hub (8), about said incidence pitch axis (14);

a pivoting connection (20) between each blade support (10) and the root (6a) of its associated blade, the pivot connection enabling the blade (6) to be pivoted relative to its blade support (10) about a blade folding axis (22);

associated with at least one of the blades (6), a blade folding/unfolding control member (24) configured to pivot said blade root (6a) relative to the blade support (10) about said folding axis (22), said folding/unfolding control member (24) comprising a first element (28) and a second element (30) translationally movable with respect to each other, the first element (28) being mounted on said hub (8) using a first pin joint (32a) and the second element (30) being mounted on a transmission device (36) using a second pin joint (32b), the transmission device being connected to said blade root (6a);

a blade folding/unfolding synchronization passive device (40), including a central synchronization element (42) rotatably mounted relative to the hub (8) about said propeller axis of rotation (4), as well as a connector element (44) associated with each blade (6), said connector element (44) including a first end mounted on said blade root (6a) about a first ball joint (32c), as well as a second end mounted on said central synchronization element (42) using a second ball joint (32d).

2. The propeller according to claim 1, characterized in that it comprises at least two blade folding/unfolding control members (24), respectively associated with two blades (6).

3. The propeller according to claim 1, characterized in that said blade folding/unfolding control member (24) is a controlled cylinder.

4. The propeller according to claim 1, characterized in that each connector element (44) is a connecting rod.

5. The propeller according to claim 1, characterized in that said central synchronization element (42) is a ring.

6. The propeller according to claim 1, characterized in that said transmission device (36) comprises two links (37) hinged to each other.

7. The propeller according to claim 1, characterized in that said blade folding axis (22) and said incidence pitch axis (14) are substantially orthogonal.

8. The propeller according to claim 1, characterized in that the number of blades (6) is between one and four.

9. The propeller according to claim 1, characterized in that the folding/unfolding control member (24) is oriented substantially parallel to the propeller axis of rotation (4) when the blades (6) lie in an active spread out position.

10. An aircraft engine (1) including a propeller (2) according to claim 1.

11. An engine according to claim 10, characterized in that it is configured such that its propeller (2) rotates at a substantially constant speed about its axis of rotation (4).

* * * * *